United States Patent [19]

Sygnator

[11] Patent Number: 4,457,654

[45] Date of Patent: Jul. 3, 1984

[54] TOOL GRIPPING FASTENER

[75] Inventor: Henry A. Sygnator, Arlington Heights, Ill.

[73] Assignee: Illinois Tool Works Inc., Chicago, Ill.

[21] Appl. No.: 362,223

[22] Filed: Mar. 26, 1982

[51] Int. Cl.³ .............................................. F16B 23/00
[52] U.S. Cl. ..................................... 411/408; 81/125; 81/451; 411/375
[58] Field of Search ................................ 411/371–377, 411/403, 404, 408; 81/451, 458, 125, 460

[56] References Cited

U.S. PATENT DOCUMENTS

| | | | |
|---|---|---|---|
| 1,433,783 | 10/1922 | Carr | 411/371 X |
| 2,627,778 | 2/1953 | Hodell | 411/372 |
| 2,902,071 | 9/1959 | La Pointe et al. | 81/451 |
| 3,286,749 | 11/1966 | Learned | 81/125 X |
| 3,298,410 | 1/1967 | Morifuji | 81/458 |
| 3,517,714 | 6/1970 | Desbarats | 81/451 |
| 3,885,492 | 5/1975 | Gutshall | 411/373 |

*Primary Examiner*—Gary L. Smith
*Assistant Examiner*—Lloyd A. Gall

*Attorney, Agent, or Firm*—Thomas W. Buckman; Donald D. Mondul; David I. Roche

[57] ABSTRACT

A fastener comprising a head, a shank, and a cap. The head has a recess in its top surface dimensioned to accommodate an appropriate tool for installing the fastener. The cap covers a substantial portion of the head and conforms closely to the head, extending into the recess in spaced relation to a substantial portion of the inner surfaces of the recess and cooperating with those surfaces during insertion of the installation tool into the recess to present appropriate dimensions to the tool to resiliently grip the tool and accommodate the tool for proper installation of the fastener. The cap is made of resilient material preferably stainless steel to provide corrosion resistance of the fastener once the fastener is fully inserted into the workpiece. Additionally, the fastener is designed to accommodate and, through interaction of the cap and installation tool, resiliently engage commonly known standard installation tools to provide easy and safe installation of such fasteners yet permit easy disengagement of an installation tool after full installation of the fastener within a workpiece.

9 Claims, 4 Drawing Figures

U.S. Patent     Jul. 3, 1984     4,457,654
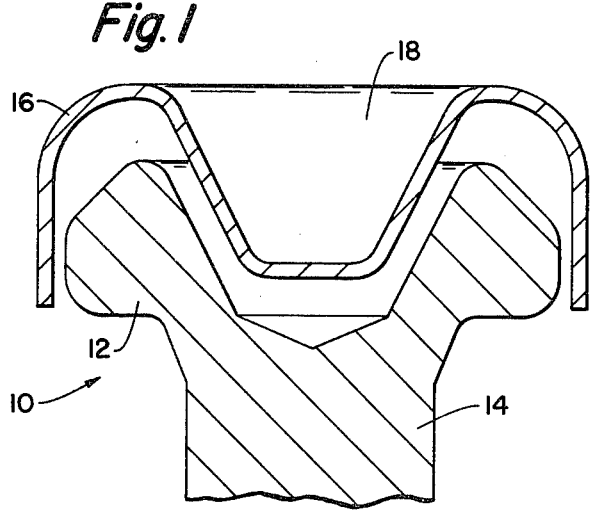
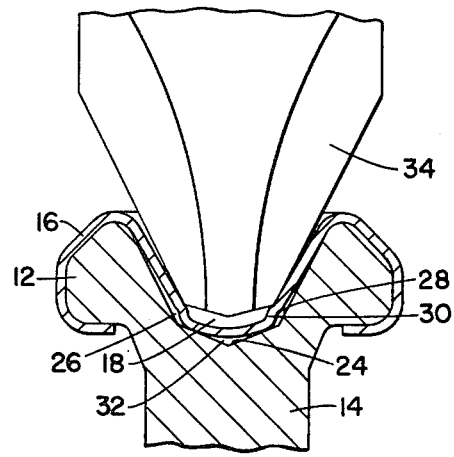
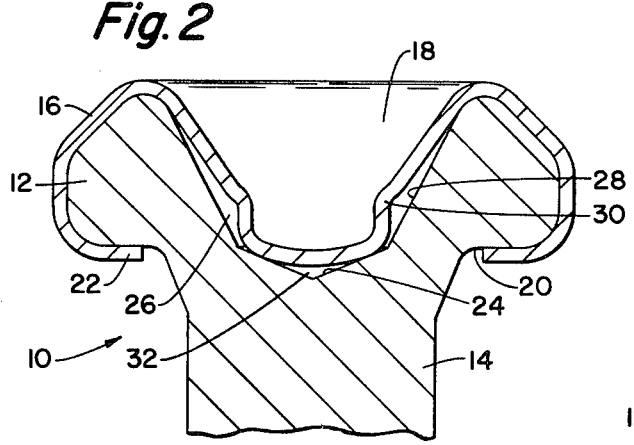
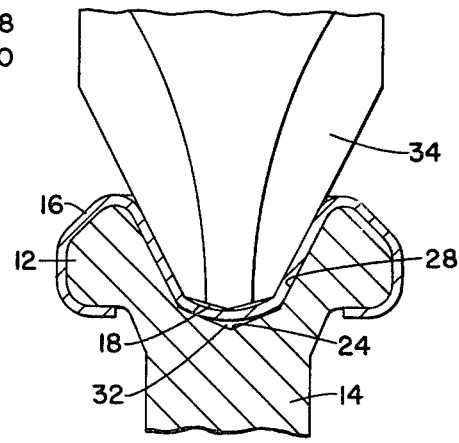

TOOL GRIPPING FASTENER

Background of the Invention

Headed fasteners are often used in environments which cause corrosion of the heads of such fasteners. Such corrosion weakens the holding power of the fastener and is seriously detrimental to cosmetic appearances provided by the fastener. One such use of a headed fastener is in the automotive industry for the attachment of chrome trim to the body of an automobile.

One solution to the above problem is to use stainless steel fasteners, which fasteners would significantly better resist corrosion. However, such fasteners are extremely expensive and a cheaper solution would be preferable.

Additionally, in assembly operations it is desirable that headed fasteners be able to provide a "stick fit" wherein the fastener resiliently engages a tool designed for installation of the fastener yet allows easy disengagement of that tool upon completion of installation of the fastener. Such a resilient engagement capability would greatly facilitate assembly processes and render them significantly safer since it would no longer be necessary for a tool operator to hold the fastener in place while driving it into the workpiece or to start the fastener by hand, then align the power tool with the head of the fastener, and then drive the fastener home with the power tool.

Summary of the Invention

This invention relates to fasteners, particularly to headed fasteners with corrosion resistant means and means to resiliently grip a tool for installing such fasteners.

The invention is a fastener comprising a head, a shank and a cap. The head has a recess in its top surface dimensioned slightly larger than necessary to accommodate an appropriate tool for installing the fastener. The cap covers a substantial portion of the head and conforms closely to the head, extending into the recess in spaced relation to a substantial portion of the inner surfaces of the recess and cooperating with those surfaces during insertion of the installation tool into the recess to present appropriate dimensions to the tool to resiliently grip the tool and accomodate the tool for proper installation of the fastener. The cap is made of a resilient material, preferably stainless steel, to provide corrosion resistance for the fastener once the fastener is fully inserted into the workpiece.

The fastener of the present invention is designed to accommodate and resiliently engage commonly known standard installation tools; no special tools are required by the present invention to provide the resilient gripping action provided by the fastener of the present invention.

It is therefore an object of this invention to provide a fastener which will inexpensively provide enhanced resistance to corrosion of the head of the fastener when the fastener is fully installed in a workpiece.

A further object of this invention is to provide a fastener which will resiliently engage commonly known installation tools to provide easy and safe installation of such fasteners yet permit easy disengagement of an installation tool after full installation of the fastener within a workpiece.

Further objects and features of the present invention will be apparent from the following specification and claims when considered in connection with the accompanying drawings illustrating the preferred embodiment of the invention.

Detailed Description of the Drawings

FIG. 1 is a side view in section of the preferred embodiment of the present invention illustrating an initial step of the process of application of the cap to the head of the fastener.

FIG. 2 is a side view in section illustrating the preferred embodiment of the present invention showing the cap of the present invention fully installed on the head of the fastener.

FIG. 3 illustrates in half section a side view of the fastener of the present invention with an installation tool beginning insertion in the cavity of the fastener.

FIG. 4 is a side view in half section of the preferred embodiment of the present invention showing the installation tool fully inserted within the cavity of the fastener.

Detailed Description of the Invention

A fastener 10 as shown in FIG. 2 is comprised of a head 12, a shank 14, and a cap 16. In the head 12 of the fastener 10, there is a recess 18 dimensioned to receive an installation tool, as will be discussed in more detail later.

As seen in FIGS. 1 and 2, the cap 16 is dimensioned such that when the cap 16 is pressed onto the head 12 so that it extends into the recess 18 and is pressed to fit around the underside 20 of the head 12 in a manner whereby the outer periphery 22 of the cap 16 grippingly engages the head 12, such pressing of the cap 16 into the recess 18 bottoms out the cap 16 at the bottom 24 of the recess 18 thereby providing a space 26 between the cap 16 and the inner wall 28 of the recess 18. In the forming of this space 26, the cap 16 is buckled and forms an annular ridge 30 in the cap 16 within the recess 18. Additionally, there is a space 32 between the cap 16 and the bottom 24 of the recess 18. It is this annular ridge 30 in the cap 16 and the space 26 between the cap 16 and the inner wall 28 of the recess 18 which interact with an installation tool to resiliently engage that tool during insertion of the fastener in a workpiece, as will be discussed in greater detail later.

Referring to FIG. 3, an installation tool 34 is shown in the position of initial insertion within the recess 18. Comparing FIG. 3 to FIG. 2, it can be seen that insertion of the tool 34 within the recess 18 deforms the cap 16 and compresses it against the inner wall 28 of the recess thereby, decreasing the volume of the space 26 between the cap 16 and the inner wall 28.

Referring now to FIG. 4, the installation tool 34 is shown fully inserted within the recess 18. When the tool 34 is in the fully inserted position as shown in FIG. 4, it may be seen that the space 26 between the cap 16 and the inner wall 28 of the recess 18 is substantially eliminated; similarly, the space 32 between the cap 16 and the bottom 24 of the recess 18 is reduced in volume by the pressing of the cap 16 against the inner wall 28 and the bottom 24 of the recess 18 as a result of the full insertion of the installation tool 34.

The insertion tool 34 is a commonly known driving tool such as a PHILLIPS ® or POZIDRIV ® (both of these names are registered trademarks of Phillips Screw Company) or other internal recess types of tools and therefore are fluted tools. The flutes of the tool 34 are resiliently graspingly engaged by the cap 16 when the tool 34 is fully inserted within the recess 18 as shown in FIG. 4. This "stick fit" facilitates installation of the fastener 10 within a workpiece without having to first hand start the fastener or otherwise hold the fastener in place while the installation process is initiated. Thus, quicker, safer installation is possible, especially with power installation tools as would by encountered in an industrial setting.

Furthermore, the gripping of the head 12 by the cap 16 through the outer periphery 22 of the cap 16 reaching to the underside 20 of the head 12 provides a corrosion resistant seal of the head 12 when the fastener 10 is fully installed snugly against a workpiece (not shown) with the workpiece in snug abutment against the outer periphery 22 of the cap 16 and the underside 20 of the head 12. Such an arrangement is significantly less expensive than providing only marginally better corrosion resistance through the use of expensive stainless steel fasteners or heavily plated fasteners.

It is to be understood that, while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. A fastener comprising a head having a top surface and a bottom surface, a shank, and a cap of resilient material, said top surface of said head having a recess defined by a plurality of surfaces, said cap covering said top surface and at least part of said bottom surface, said cap extending into said recess while maintaining a spaced relationship with a substantial portion of said surfaces of said recess, whereby insertion of an installation tool into said recess displaces said cap within said recess thereby causing said cap to resiliently engage said tool.

2. A fastener as recited in claim 1 wherein said cap is made of a metallic material.

3. A fastener as recited in claim 1 wherein said recess is dimensioned so that when said cap is pressed into said recess by insertion of said installation tool, the cumulative dimensions of said recess and said cap are substantially complementary to the dimensions of said tool whereby said tool is thereby capable of effecting installation of said fastener.

4. A fastener as recited in claim 1 wherein said recess is adapted to accommodate said tool appropriately to enable said tool to apply rotary force to said fastener to drivingly install said fastener into a workpiece.

5. A fastener assembly comprising a fastener and a cap, said fastener having a head including a recess defined by a plurality of surfaces therein, said cap covering a substantial portion of said head and closely conforming to said head and said recess surfaces, said cap being in spaced relation with said surfaces of said recess and cooperating therewith to resiliently grip an installation tool inserted into said recess.

6. A fastener assembly as recited in claim 5 wherein said cap is made of a metallic material.

7. A fastener assembly as recited in claim 5 wherein insertion of said tool into said recess displaces said cap against said surfaces of said recess, said recess being dimensioned so that the cumulative dimensions of said recess and said cap are substantially complementary to the dimensions of said tool whereby said tool is thereby capable of effecting installation of said fastener assembly.

8. A fastener and a tool for installing said fastener, in combination, said fastener comprising a head, a shank and a cap, said head having a recess defined by a plurality of surfaces and dimensioned larger than necessary to accommodate said tool, said cap covering a substantial portion of said head and conforming closely thereto, said cap extending into said recess in spaced relation to a substantial portion of said surfaces of said recess and cooperating with said surfaces during insertion of said tool into said recess to present appropriate dimensions to said tool to resiliently grip said tool and accommodate said tool for proper installation of said fastener.

9. A fastener comprising a head having a top surface and a bottom surface, a shank, and a cap of resilient material, said top surface having a recess defined by a plurality of surfaces, said cap covering said top surface and at least part of said bottom surface, said cap extending into said recess while maintaining a spaced relationship with a substantial portion of said surfaces of said recess, said recess being adapted to receive an installation tool therein and dimensioned so that the cumulative dimensions of said recess and said cap are substantially complementary to the dimensions of said tool so that insertion of said tool into said recess presses said cap against said surfaces of said recess and said tool is enabled to apply rotary force against said surfaces of said recess through said cap to drivingly install said fastener into a workpiece, said cap cooperating with said surfaces of said recess and said tool to resiliently engage said tool.

* * * * *